US011194122B2

(12) United States Patent
Stuible et al.

(10) Patent No.: US 11,194,122 B2
(45) Date of Patent: Dec. 7, 2021

(54) LENS WITH A FIXED FOCAL LENGTH AND A CONSTANT STRUCTURAL LENGTH FOR AUTOFOCUS APPLICATIONS

(71) Applicant: Leica Camera AG, Wetzlar (DE)

(72) Inventors: Dietmar Stuible, Wetzlar (DE); Sigrun Kammans, Herborn (DE)

(73) Assignee: Leica Camera AG, Wetzlar (DE)

( * ) Notice: Subject to any disclaimer, the term of this patent is extended or adjusted under 35 U.S.C. 154(b) by 148 days.

(21) Appl. No.: 16/333,922

(22) PCT Filed: Sep. 18, 2017

(86) PCT No.: PCT/DE2017/100797
§ 371 (c)(1),
(2) Date: Mar. 15, 2019

(87) PCT Pub. No.: WO2018/050175
PCT Pub. Date: Mar. 22, 2018

(65) Prior Publication Data
US 2019/0204566 A1 Jul. 4, 2019

(30) Foreign Application Priority Data
Sep. 18, 2016 (DE) .................... 10 2016 117 547.1

(51) Int. Cl.
*G02B 9/64* (2006.01)
*G02B 13/00* (2006.01)
(Continued)

(52) U.S. Cl.
CPC ................ *G02B 9/64* (2013.01); *G02B 9/60* (2013.01); *G02B 13/006* (2013.01);
(Continued)

(58) Field of Classification Search
CPC ... G02B 9/60; G02B 9/62; G02B 9/64; G02B 13/0045; G02B 13/005; G02B 13/006; G02B 13/02; G02B 13/18; G02B 27/0025
(Continued)

(56) References Cited

U.S. PATENT DOCUMENTS 4,726,669 A * 2/1988 Angenieux ............ G02B 13/02
359/740
7,477,459 B2 * 1/2009 Liao ........................ G02B 9/34
359/772

(Continued)

FOREIGN PATENT DOCUMENTS

CN 102053348 A 5/2011
JP 2000-214380 A 8/2000
(Continued)

OTHER PUBLICATIONS

English translation of International Preliminary Report on Patentability (PCT/IB/338 & PCT/IB/373) issued in PCT Application No. PCT/DE2017/100797 dated Mar. 28, 2019, including English translation of document C2 (German-language Written Opinion (PCT/ISA/237) previously filed on Mar. 15, 2019) (seven (7) pages).

(Continued)

*Primary Examiner* — Jordan M Schwartz
(74) *Attorney, Agent, or Firm* — Crowell & Moring LLP

(57) ABSTRACT

A lens with a fixed focal length comprising including a first front lens-element group, a second lens-element group, a third lens-element group, a fourth lens-element group, and a fifth back lens-element group. Relative to an imaging plane in a lens barrel and both the focusing front group and the focusing back group are movable jointly relative to one another and to the lens-element groups arranged in a stationary manner in order to focus the lens on objects at different object distances. The front lens-element group has (Continued)

a positive refractive power and the central group and the back lens-element group have a negative refractive power.

17 Claims, 6 Drawing Sheets

(51) Int. Cl.
    *G02B 27/00*       (2006.01)
    *G02B 13/04*       (2006.01)
    *G02B 9/60*         (2006.01)
    *G02B 13/18*       (2006.01)

(52) U.S. Cl.
    CPC ......... *G02B 13/0045* (2013.01); *G02B 13/04* (2013.01); *G02B 13/18* (2013.01); *G02B 27/0075* (2013.01)

(58) Field of Classification Search
    USPC ................ 359/754–757, 759, 763–764, 767
    See application file for complete search history.

(56) References Cited

U.S. PATENT DOCUMENTS

| | | | |
|---|---|---|---|
| 8,619,374 B2 | 12/2013 | Abe et al. | |
| 2002/0060855 A1* | 5/2002 | Ohashi | G02B 15/173 359/684 |
| 2004/0017605 A1 | 1/2004 | Kasahara et al. | |
| 2008/0144186 A1* | 6/2008 | Feng | G02B 3/12 359/666 |
| 2009/0015935 A1* | 1/2009 | Szapiel | F41G 1/38 359/674 |
| 2010/0157445 A1 | 6/2010 | Taki | |
| 2011/0096410 A1 | 4/2011 | Ryu | |
| 2011/0199689 A1 | 8/2011 | Ishibashi | |
| 2012/0081798 A1 | 4/2012 | Ryu | |
| 2013/0070124 A1 | 3/2013 | Katsuyama et al. | |
| 2014/0016025 A1* | 1/2014 | Kosaka | H04N 5/23209 348/363 |
| 2014/0146405 A1* | 5/2014 | Tsutsumi | G02B 9/12 359/740 |
| 2014/0184887 A1 | 7/2014 | Yonetani et al. | |
| 2014/0212123 A1* | 7/2014 | Sato | G03B 9/06 396/510 |
| 2015/0247994 A1 | 9/2015 | Tomioka | |
| 2015/0323764 A1 | 12/2015 | Mori | |
| 2016/0178875 A1* | 6/2016 | Matsumura | G02B 15/1461 359/684 |
| 2016/0299415 A1* | 10/2016 | Minefuji | G03B 21/28 |
| 2017/0192207 A1* | 7/2017 | Chen | G02B 5/005 |
| 2017/0374271 A1* | 12/2017 | Takao | H04N 5/232122 |
| 2018/0059382 A1 | 3/2018 | Noda | |
| 2018/0164540 A1 | 6/2018 | Kawamura et al. | |
| 2019/0369371 A1 | 12/2019 | Katou et al. | |
| 2020/0192060 A1* | 6/2020 | Sawamoto | G02B 13/02 |

FOREIGN PATENT DOCUMENTS

| | | |
|---|---|---|
| JP | 2007-298832 A | 11/2007 |
| JP | 2011-48232 A | 3/2011 |
| JP | 2011-191743 A | 9/2011 |
| JP | 2012-58682 A | 3/2012 |
| JP | 2012-242742 A | 12/2012 |
| JP | 2015-34899 A | 2/2015 |
| JP | 2016-109810 A | 6/2016 |
| JP | 2016-118770 A | 6/2016 |
| WO | WO 2018/139160 A1 | 11/2019 |

OTHER PUBLICATIONS

International Search Report (PCT/ISA/210) issued in PCT Application No. PCT/DE2017/100797 dated Jan. 4, 2018 with English translation (five (5) pages).

German-language Written Opinion (PCT/ISA/237) issued in PCT Application No. PCT/DE2017/100797 dated Jan. 4, 2018 (six (6) pages).

International Search Report (PCT/ISA/210) issued in PCT Application No. PCT/DE2017/100796 dated Jan. 5, 2018 with English translation (five (5) pages).

German-language Written Opinion (PCT/ISA/237) issued in PCT Application No. PCT/DE2017/100796 dated Jan. 5, 2018 (six (6) pages).

International Search Report (PCT/ISA/210) issued in PCT Application No. PCT/DE2017/100798 dated Mar. 7, 2018 with English translation (10 pages).

German-language Written Opinion (PCT/ISA/237) issued in PCT Application No. PCT/DE2017/100798 dated Mar. 7, 2018 (eight (8) pages).

U.S. Office Action issued in U.S. Appl. No. 16/333,932 dated Feb. 4, 2021 (21 pages).

U.S. Office Action issued in U.S. Appl. No. 16/333,938 dated Mar. 18, 2021 (26 pages).

U.S. Office Action issued in U.S. Appl. No. 16/333,932 dated Jun. 11, 2021 (12 pages).

\* cited by examiner

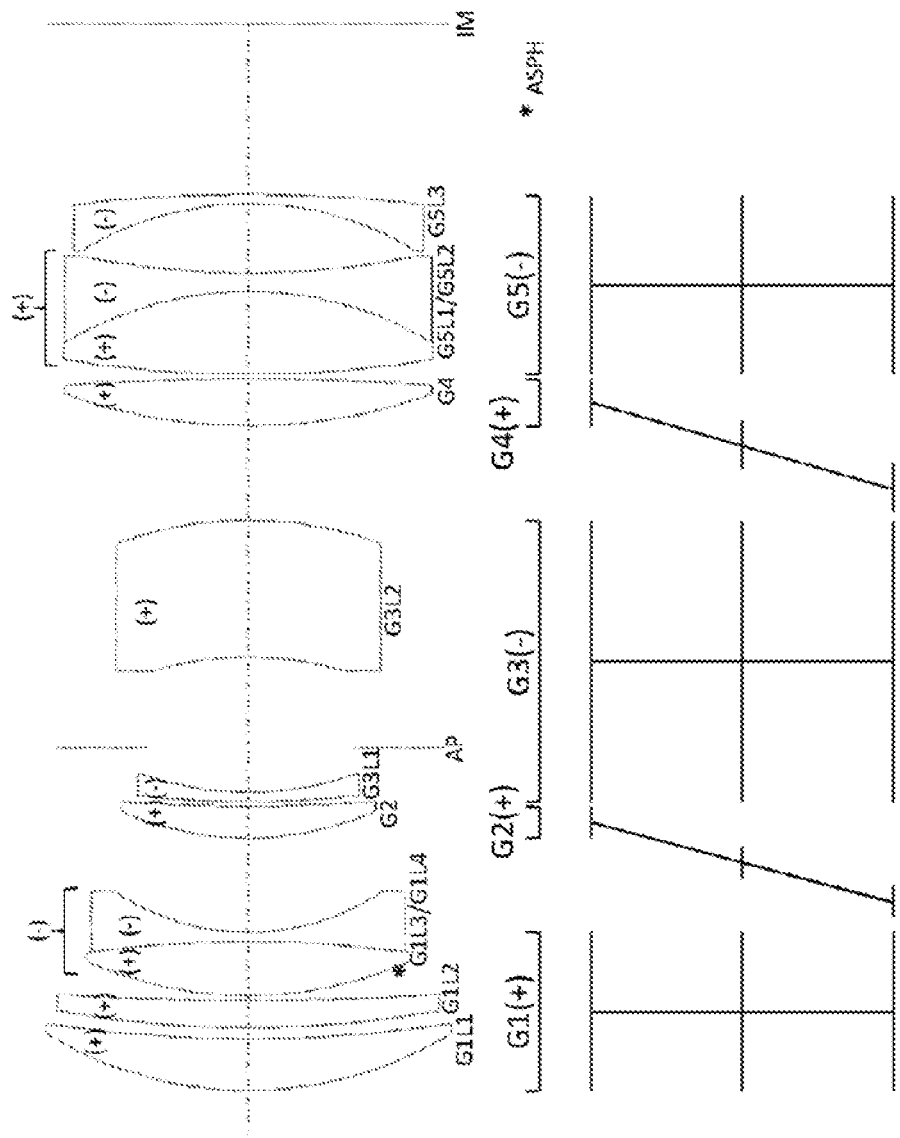

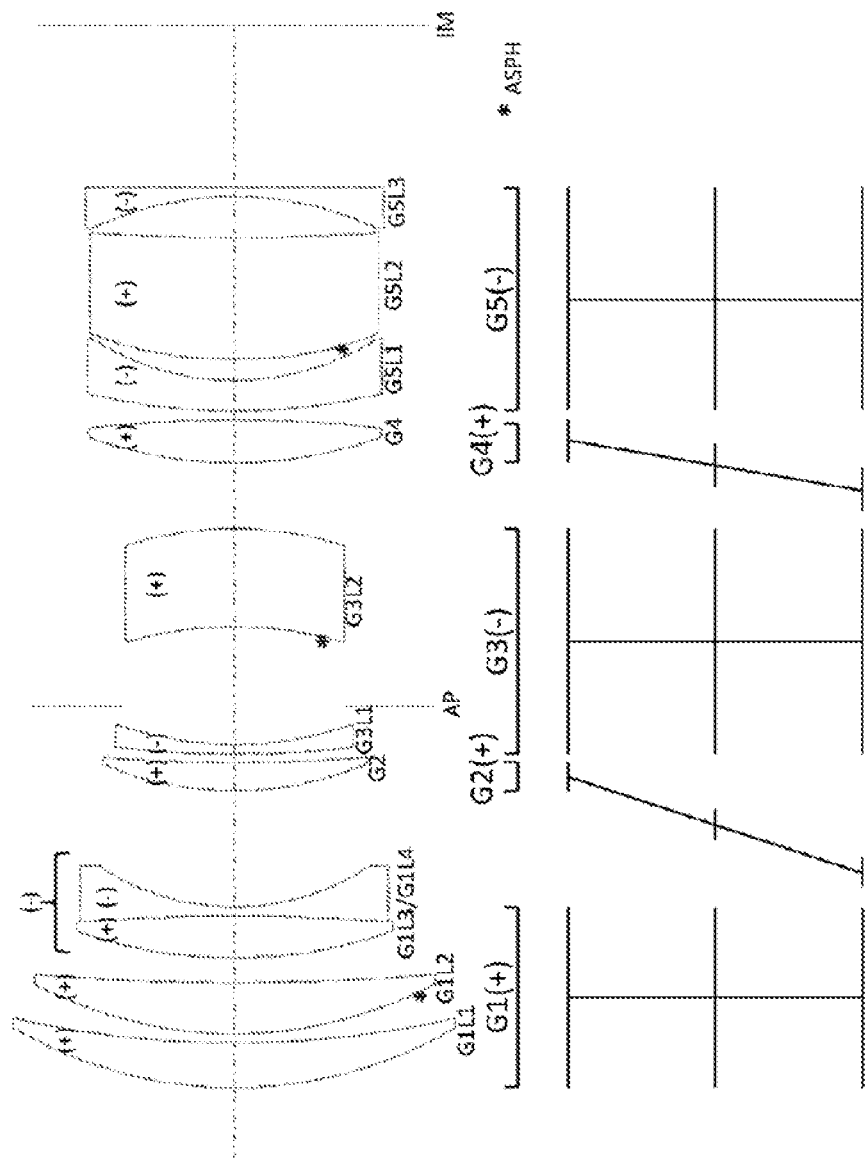

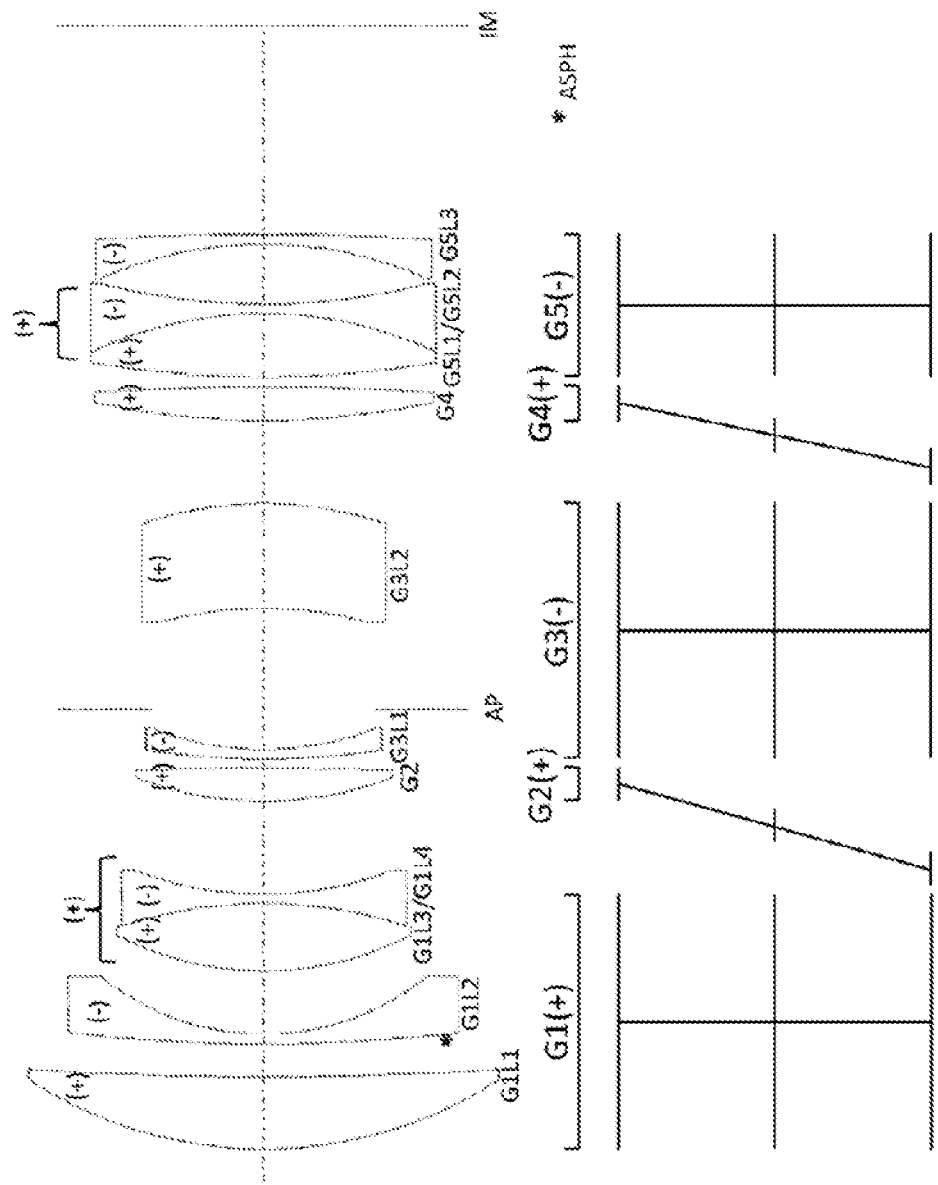

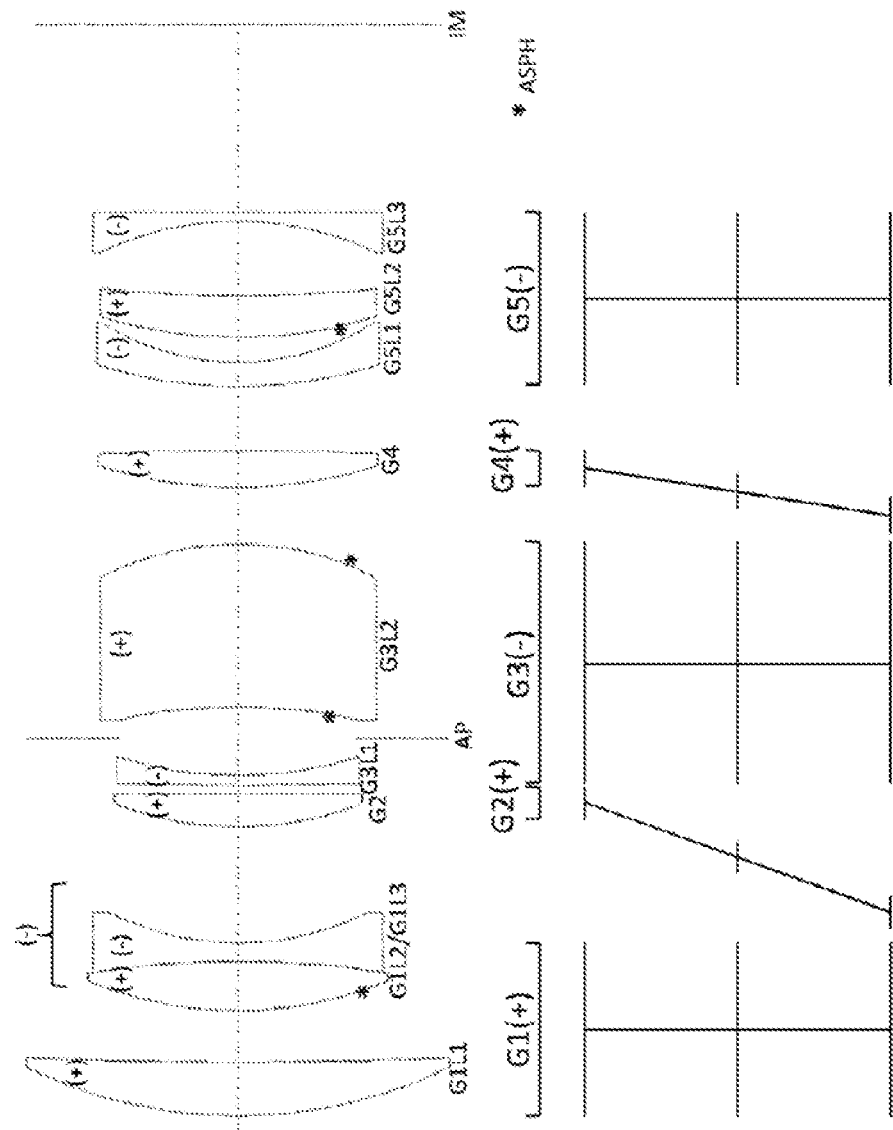

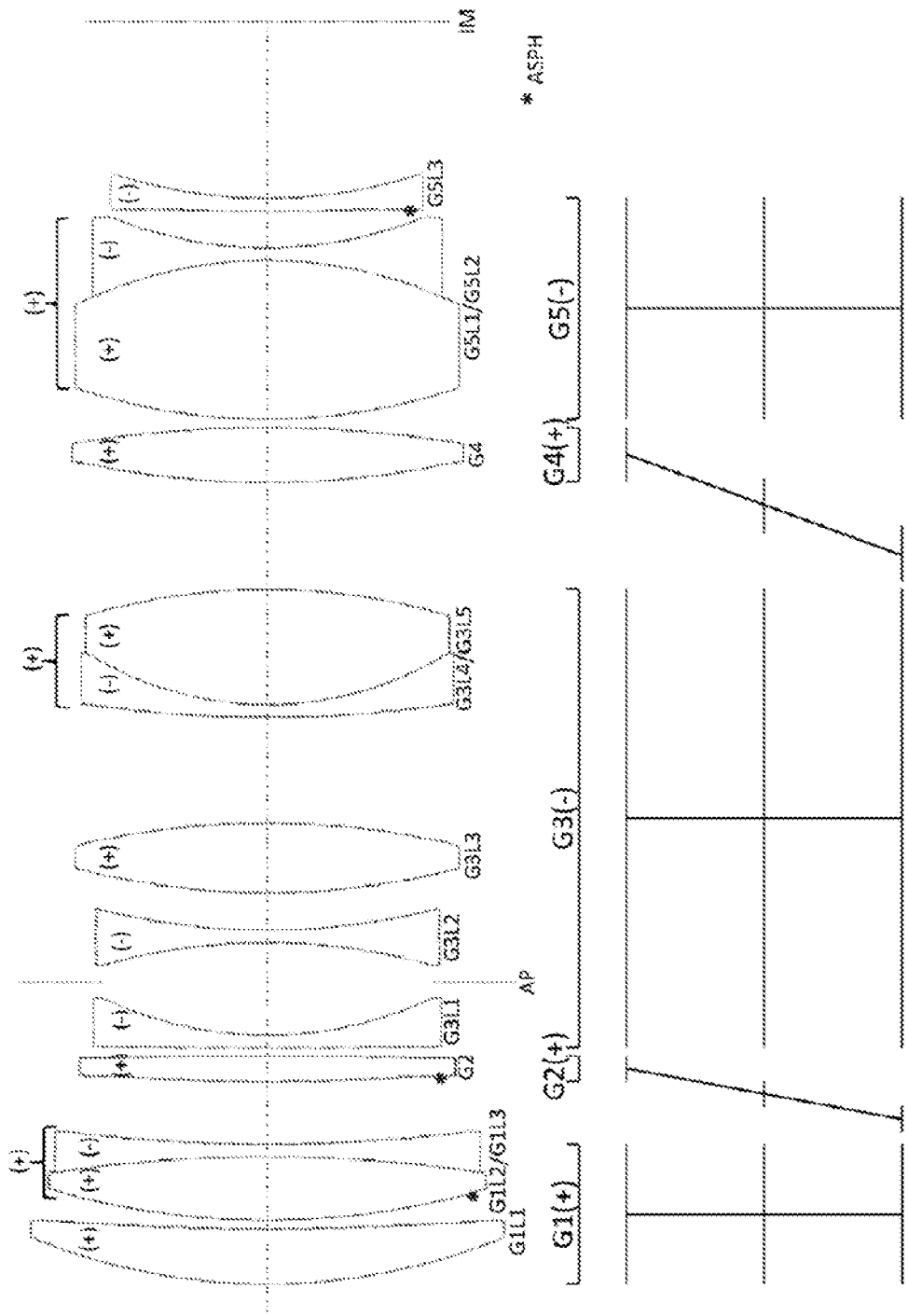

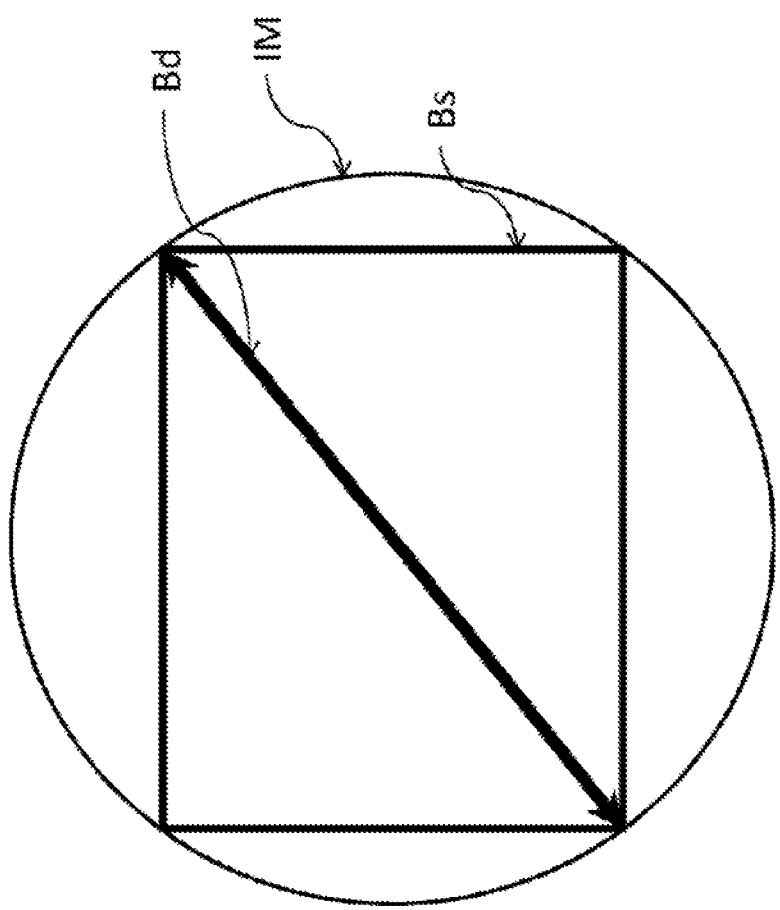

LENS WITH A FIXED FOCAL LENGTH AND A CONSTANT STRUCTURAL LENGTH FOR AUTOFOCUS APPLICATIONS

BACKGROUND

The embodiments of the invention relate to an interchangeable lens with a fixed focal length. Such lenses are used for photographic image recording purposes from analog photography and are likewise used for digital image recording. To an increasing extent digital cameras no longer have a mirror which is pivotable into and out of the image recording beam path and which deflects the object field to be photographed into a viewfinder via a prism for focusing purposes and in order to select the image detail, rather the image selection is carried out by permanent image recording by means of the image recording sensor and on the basis of an object detail obtained therefrom, which is represented on a display on the rear side of the camera, or with the aid of an electronic viewfinder.

The focusing of these lenses is carried out automatically with the aid of electronic autofocus signals and corresponding driving of the focusing element in the lens. Photographic lenses for producing a good imaging performance usually consist of two or more lens-element groups, which in turn have individual lens elements mounted in a stationary manner or in a displaceable manner along the optical axis. A lens-element group is displaceable along the optical axis for the purpose of focusing the lens at different object distances. This can be for example the lens head, that is to say the front lens-element group facing the object plane, or the complete lens. Such an arrangement is also called total focusing. With this type of focusing, however, the structural length of the lens changes during focusing, which contains disadvantages with regard to tightness. Therefore, lenses exist in which a lens element mounted in a displaceable manner in the lens, the so-called focusing element, is displaced along the optical axis. Such an arrangement is also called internal focusing. It is true that lenses of this design can be focused in wide ranges from an infinite object distance through to close range of a few meters or even centimeters, that is to say that the object is imaged sharply onto the image recording plane; however, the optical imaging performance decreases precisely at close range. Optical image aberrations such as distortion, image field curvature, aperture aberrations, chromatic aberrations and coma increase. Despite focusing at the desired object distance, the image results then often no longer satisfy the requirements in respect of the imaging performance of modern image recording systems. If a high imaging performance is nevertheless intended to be achieved, complicated and expensive lens designs having a high number of different lens elements are required. Alternatively, in order to increase the imaging performance in the case of lenses with total focusing, principally for close range, a second movable lens element, a so-called floating element, may be provided which counteracts the imaging aberrations, but for the rest has hardly any influence on the focus position.

In order to realize lenses with variable focal lengths (zoom lenses), at least two lens elements or lens-element groups which are adjustable relative to one another on curves are normally provided. The focusing is still carried out by means of a focus element that is adjustable for focusing. In the case of such lenses, accordingly, one group from two lens-element groups performs the focal length variation and, independently thereof, a further lens-element group is used for focusing.

One such lens with a variable focal length is shown in US 2013/0070124 A1, for example. This lens comprises three movable lens-element groups for focal length and focus variation.

U.S. Pat. No. 8,619,374 B2 discloses an interchangeable lens with a variable focal length. A stationary front lens-element group is followed by an axially adjustable lens-element group for changing the focal length. Two mutually independently adjustable focusing lens-element groups are inserted between two further stationary lens-element groups. Imaging aberrations that arise depending on the change in focal length are intended to be compensated for with the aid of the two focusing lens-element groups.

SUMMARY

The problem addressed by the embodiments of the invention was that of making possible, in the case of interchangeable lenses with a fixed focal length, a very high constant image quality during focusing at different object distances from infinity to extremely close range and in the case of an imaging scale of up to 1:3, wherein the lens elements required for focusing should have a simple construction with low weight in order to be able to achieve a fast and quiet autofocus drive having high accelerations. Furthermore, the lenses should be suitable for use on mirrorless recording systems with a short flange focal distance, have a short back focal distance and at the same time have a sufficiently large distance between the exit pupil of the lens and the imaging plane. For suitability for modern image sensors, the angle of incidence of light in the imaging plane, as viewed from the perpendicular, should not become too large.

This problem is solved according to the inventive lens. With regard to the solution features specified in the claims it should be noted that in modern optical design use is usually made of automatic correction programs, such as e.g. "Code V" from Optical Research Associates, which are able to calculate, from predefined lens-element sequences and refractive power distributions, proposals for functional lens systems having a correction state optimized for a specific task. On the basis of targeted alterations of the specified parameters by the optical designer, the correction state automatically achieved is improved further in each case.

With the features of claim 1, it is possible in this way already to obtain the design data for radii, lens-element thicknesses, distances between lens elements, refractive indices and Abbe numbers of the optical glasses to be used. When the features specified in the dependent claims are taken into account, the design parameters can be progressively improved in a targeted manner.

Exemplary embodiments of the lens according to the invention are illustrated to scale in the drawing design data can be gathered from the tables assigned to the respective figures. It is evident to the person skilled in the art, an optical designer, that the design complexity for lenses according to the embodiments of the invention decreases if a lower optical imaging performance is accepted in return.

The solution feature of lenses according to the embodiments of the invention consists in providing in a lens barrel two focusing lens-element groups mounted in a displaceable manner along an optical axis with respect to an imaging plane, wherein a focusing front group as viewed from the object side is arranged upstream and a focusing back group as viewed from the object side is arranged downstream, of a stationary central group having lens elements and an aperture stop (iris diaphragm). As a result of the control of the two focusing lens-element groups jointly relative to one another and to the other lens-element groups arranged in a stationary manner in the lens barrel, the course of the image aberrations that is introduced during focusing at different object distances is advantageously mutually compensated for. In addition, a lens according to the embodiments of the invention comprises a front lens-element group, which is stationary as viewed from the object side, and a stationary back lens-element group facing the imaging plane. In this way, a lens with a fixed focal length can be realized which consists of time lens-element groups of which three are mounted in a stationary manner and two are mounted in a displaceable manner along the optical axis for focusing proposes.

In contrast to lenses having total focusing with a floating element, in the case of the focusing according to the embodiments of the invention (also called double focusing hereinafter) the two focusing lens-element groups jointly perform the displacement of the focus position for focusing onto the imaging plane. The travel of the respective focusing group for focusing from infinity to the near setting (maximum movement distance corresponds to total travel) is limited by the mechanical structural length of the lens and the motor/drive concept of the autofocus. In this case, the ratio of the two respective total travels to one another can be one or else not equal to one. It results from design-dictated spatial limitations and can be varied in order to optimize the aberrations.

According to the embodiments of the invention, in this case the front lens-element group has a positive refractive power and the central group and the back lens-element group have a negative refractive power.

In one particular embodiment of the lenses, the focusing front group and the focusing back group have a positive refractive power, wherein the focusing front group and the focusing back group are embodied as single lens elements. However, they can in each case also be embodied as a lens-element doublet, wherein the positive total refractive power is maintained in each case.

During focusing from infinity to the near setting, the focusing elements move away from the imaging plane.

In the case of lenses for the full-frame format (image circle diameter 43.3 mm) with a long focal length, which are known as telephoto lenses, having focal lengths of e.g. 55 mm to 185 mm, it has been found to be advantageous preferably to use lens elements having positive refractive powers in the front lens-element group. In order to particularly advantageously adapt a favorable distribution of the refractive powers of all lens-element groups to design stipulations, a central group having a negative refractive power has proven to be advantageous. This in particular also ensures a favorable distribution of the refractive powers in the back assembly and compliance with design stipulations arising for example from the predefined maximum external dimensions of the lens, the predefined maximum aperture and lens-element diameters and from the limiting dimensions of the camera bayonet, in particular the free internal diameter thereof.

In this way, it is possible preferably to realize a 75 mm or a 90 mm lens, each having a maximum aperture number of 1.4 or 2.0, wherein the focal length indications relate to the full-frame format (image circle diameter 43.3 mm). For the person skilled in the art it is possible, whilst complying with the parameters specified in the patent claims, to realize lenses having a smaller (down to e.g. 0.9) or larger (e.g. 4.0) maximum aperture number. With a smaller maximum aperture number the design complexity increases, which has disadvantageous effects on the lens volume, the number of lens elements required and the lens-element diameters if the optical imaging performance (aberrations) is intended not to deteriorate to an excessively great extent. With a larger maximum aperture number, by contrast, the design complexity usually decreases with the imaging performance remaining the same or being poorer.

A scaling of the geometric data of the lens to other image formats is possible with the respective maximum aperture number being maintained and brings about a corresponding scaling of the focal length. Lenses realized in this way, with design features otherwise corresponding with respect to the embodiments of the invention, are likewise the subject matter of the embodiments of the invention and fall within the scope of protection of the patent claims.

In one particular embodiment of the lens according to the embodiments of the invention the ratio $f1/f$ of the focal lengths $f1$ of the front lens-element group and $f$ of the entire lens lies between 0.5 and 30, the ratio $f2/f$ of the focal lengths $f2$ of the focusing front group and $f$ of the entire lens lies between 0.3 and 10, the ratio $f3/f$ of the focal lengths $f3$ of the central group and $f$ of the entire lens lies between $-30$ and $-0.3$, the ratio $f4/f$ of the focal lengths $f4$ of the focusing back group and $f$ of the entire lens lies between 0.1 and 10, and the ratio $f5/f$ of the focal lengths $f5$ of the back lens-element group and $f$ of the entire lens lies between $-40$ and $-0.1$.

In a first step of optimizing the ratio $f1/f$, limitation to a range of between 1.5 and 10 has proved to be expedient. In order to avoid an excessive sensitivity with regard to mounting tolerances to be complied with, it is particularly advantageous to limit the ratio downwardly (small absolute values), and in order to achieve a structural size that is as compact as possible, the ratio $f1/f$ should be limited upwardly (large absolute values). An embodiment of the invention that is optimized with regard to mounting tolerances and structural size therefore has a ratio $f1/f$ of between 2.6 and 2.9.

In one particular embodiment of the lens according to the invention, a reduction of the focusing travel of the focusing front group and of the structural length of the lens can be achieved by means of a limitation of the ratio $f2/f$ to a range of between 0.5 and 2.0. In general, small focusing travels are advantageous for fast focusing, but they also increase the tolerance sensitivity. On the other hand, an excessively large focusing travel firstly increases the structural length and secondly requires powerful and fast motorized drives having a high energy consumption for focusing. The limitation of the ratio $f2/f$ to a range of between 0.8 and 1.1 is therefore particularly advantageous for a double focusing according to the embodiments of the invention.

An advantageous optimization carried out in the same way for the focusing back group is manifested in the case of a limitation of the ratio $f4/f$ to a range of between 0.3 and 2.0, wherein a further optimization can be achieved by a limitation to a range of between 0.6 and 0.8.

An advantageous configuration of the lens elements of the central group with regard to manufacturing tolerances and structural size is achieved by means of a limitation of the ratio $f3/f$ to a range of between $-10$ and $-0.8$, wherein an optimization according to the embodiments of the invention resides in a ratio $f3/f$ in a range of between $-1.8$ and $-1.1$.

Large absolute values of the ratio $f5/f$ of the back lens element group result in a disadvantageously long structural length; with small absolute values, the lens-element group becomes sensitive with regard to mounting tolerances. An advantageous optimization therefore consists in a limitation of the ratio $f5/f$ in a range of between $-2.0$ and $-0.5$.

Particularly in the case of lenses for mirrorless photographic cameras, in which experience shows that there are very short distances between the last lens element (located near the imaging plane) in the light direction and the imaging plane, it is advantageous to embody the angle of incidence of the light, as viewed from the perpendicular to the imaging plane, such that it is not too large. An angle of incidence of the light of less than 35° has proved to be advantageous. The lenses are thus particularly suitable for camera systems having a short flange focal distance and a short back focal distance, e.g. less than 25 mm in each case, relative to the full-frame format described above. Excessively small absolute values of the ratio f5/f therefore have a disadvantageous effect since they increase the angle of incidence of the light and vignetting thus increases. An embodiment of the lens that is optimized with regard to this problem area therefore has a value in the range of between −1.0 and −0.8 for the ratio f5/f.

In one development according to the embodiments of the invention, the lens has a ratio of the total focal length f to the image circle diameter in the imaging plane of between 1 and 5. In this way and as a result of the interaction of the refractive powers of the five lens-element groups as defined more specifically above, it is possible to realize lenses with a focal length of between 43.3 mm and 216.5 mm, relative to the full-frame format described above.

Lightweight focusing groups are advantageous for a high focusing speed. A ratio of the volume V of respectively the focusing front group and focusing back group to the image circle diameter in the imaging plane raised to the third power is less than 0.1 ($V/Bd^3<0.1$) and in particular lies below 0.08 ($V/Bd^3<0.08$). Particularly advantageously the respective focusing group has a weight of less than 10 g (grams). The value for the relative volume of 0.08, relative to the full-frame format, then corresponds to a weight of 23.2 g in the case of a lightweight glass, such as, for example, N-PSK53A from Schott, and to a weight of 35.8 g in the case of a heavy glass, such as, for example, N-LASF31A from Schott. In the case of medium-format systems having an image circle diameter 1.5 times larger, lens-element weights of 78.3 g in the case of a lightweight glass and 120.8 g in the case of a heavy glass thus result. In the case of APS systems having an image circle diameter 1.5 times smaller, lens-element weights of 6.9 g in the case of a lightweight glass and 10.6 g in the case of a heavy glass thus result.

A low weight is advantageous for the focusing speed and has an advantageous effect on motor and noise concepts In one particular embodiment of the lens according to the invention, the stationary front lens-element group having a positive total refractive power consists of four lens elements, wherein the first, second and third lens elements have a positive refractive power and the fourth lens element has a negative refractive power, and wherein the third and fourth lens elements are preferably combined to form a lens-element doublet having a negative total refractive power. This lens-element doublet can be embodied as a cemented element or in a manner composed of single lens elements. One exemplary embodiment comprising a front lens-element group according to the invention is illustrated as lens 1:2 75 mm in FIG. 1 of the drawing and is described in even greater detail with reference to the drawing. In a further embodiment, the front lens-element group, with a construction that is substantially identical, has the second lens element having a negative refractive power, wherein the third lens element has a positive refractive power and the fourth lens element has a negative refractive power and said third and fourth lens elements are combined to form a lens-element doublet having a positive total refractive power. An alternative configuration of the front lens-element group, a first and a second lens element have a positive refractive power and a third lens element has a negative refractive power, wherein the second and third lens elements are combined to form a lens-element doublet having a negative total refractive power.

The focusing front group and the focusing back group can each be embodied as a single lens having a positive refractive power, but also as a lens-element doublet, wherein the positive total refractive power is maintained in each case.

The stationary central group having a negative total refractive power consists of two lens elements, between which the aperture stop (iris diaphragm) is arranged, and the first lens element has a negative refractive power and the second lens element has a positive refractive power. One exemplary embodiment having a central group according to the invention is illustrated as a lens 1:2 90 mm in FIG. 2 of the drawing and is described in even greater detail with reference to the drawing.

In an alternative embodiment, the central group consists of five lens elements and the aperture stop (iris diaphragm), wherein the first and second lens elements have a negative refractive power, the third lens element has a positive refractive power, the fourth lens element has a negative refractive power and the fifth lens element has a positive refractive power, wherein the fourth and fifth lens elements are combined to form a lens-element doublet having a positive total refractive power. One exemplary embodiment having such a central group is illustrated as a lens 1:1.4 75 mm in FIG. 5 of the drawing and is described in even greater detail with reference to the drawing.

The stationary back lens-element group having a negative total refractive power consists of three lens elements, wherein the first lens element has a positive refractive power, the second lens element has a negative refractive power and the third lens element has a negative refractive power. In this case, the first and second lens elements are preferably combined to form a lens-element doublet having a positive total refractive power.

In an alternative embodiment, the back lens-element group consists of three lens elements, wherein the first lens element has a negative refractive power, the second lens element has a positive refractive power and the third lens element has a negative refractive power. One exemplary embodiment having such a back lens-element group is illustrated as a lens 1:2 75 mm in FIG. 4 of the drawing and is described in even greater detail with reference to the drawing.

For the correction of the monochromatic imaging aberrations, such as aperture aberrations, coma, astigmatism, curvature and distortion, at least one of the five lens-element groups contains a lens element having, one or two aspherical surfaces, wherein the latter are preferably provided in the stationary lens-element groups.

In order to be able to ensure a short back focal distance (e.g. less than 25 mm, relative to the full-frame format) suitable for mirrorless recording systems and a position of the exit pupil that is suitable for image recording sensors, according to the embodiments of the invention the back lens-element group contains at least one lens element comprising an optical material having a refractive index rye of greater than 1.8. In this way, it is also possible to comply with limitations for the maximum diameters of the lens elements on account of limiting diameters, e.g. of a bayonet, that are predefined by the camera or image recording system. With the features mentioned above concerning the five lens-element groups, in particular those concerning the back lens-element group, it is possible to realize lenses having a sufficiently large distance between the exit pupil and the imaging plane, e.g. greater than 40 mm. A small angle of incidence of the light, e.g. less than 35°, is ensured in this way.

The central group contains at least one lens element comprising an optical material having anomalous partial dispersion (SCD) of less than −0.07 or greater than 0.07 in order to correct the chromatic imaging aberrations.

The front lens-element group contains at least one lens element comprising an optical material having anomalous partial dispersion (SCD) of greater than 0.07 in order to correct the chromatic imaging aberrations.

At least one of the focusing groups contains a lens element comprising an optical material having anomalous partial dispersion (SCD) of greater than 0.07 in order to minimize the chromatic aberrations that vary during focusing.

Lens elements having an anomalous partial dispersion have the task of correcting the wavelengths of the secondary spectrum (violet-blue wavelength range). The partial dispersion is a property of the glass material that describes the ratio of the refractive index at short wavelengths, here in the violet-blue wavelength range, to the refractive index at long wavelengths, here in the red wavelength range. In the case of glass materials having anomalous partial dispersion, said ratio deviates from that of a normal glass material defined as standard, such as e.g. N-F2, a glass manufactured by Schott.

There is a positive and a negative anomalous partial dispersion. The SCD values, either positive or negative, indicate the absolute value and thus the effect of the anomalous partial dispersion. In order to be able to utilize the anomalous partial dispersion of the glass for the chromatic correction, there is a need for a particular combination of refractive power, position of the lens element in relation to the aperture and sign of the anomalous partial dispersion of the respective lens element.

Exemplary embodiments of the lenses according to the invention for the full-frame format are illustrated schematically in the drawing and are described in more specific detail below with reference to the figures.

In this case, in the figures:

BRIEF DESCRIPTION OF THE DRAWINGS

FIG. 1 shows a lens-element section through a lens with the focal length 75 mm,

FIG. 2 shows a lens-element section through a lens with the focal length 90 mm,

FIG. 3 shows a lens-element section through a lens with the focal length 75 mm,

FIG. 4 likewise shows a lens-element section through a lens with the focal length 75 mm, and FIG. 5 shows the lens-element section through a further lens with the focal length 75 mm, FIG. 6 shows an image sensor in an imaging plane IM.

DETAILED DESCRIPTION

The movement paths of the respective lens-element groups during the focusing process are illustrated below the lens-element sections in the figures. Horizontal lines represent the positions of the lens-element groups G1, G2, G3, G4 and G5. The upper lines thereof identify the positions in the focus setting infinity, the lower lines the positions in the focus setting at the shortest object distance, and the central lines the positions in a central focus setting. The perpendicular lines are assigned to the stationary lens-element groups G1, G3 and G5, and the oblique lines to the displaceable focusing groups G2 and G4.

The lens-element sections of FIGS. 1 to 4 apply for maximum aperture 2, while FIG. 5 shows a lens with the maximum aperture 1.4.

In the case of the lens illustrated in FIG. 1, the first lens-element group G1 having a positive total refractive power comprises in the light direction a convexo-concave lens element G1L1 having a positive refractive power, a convexo-concave lens element G1L2 having a positive refractive power and a lens-element doublet G1L3/G1L4 having a negative total refractive power, consisting of a biconvex lens element G1L3 having a positive refractive power and a biconcave lens element G1L4 having a negative refractive power. This lens-element group, referred to as front lens-element group, is stationary. The first lens-element surface of the lens-element doublet G1L3/G1L4 in the light direction is embodied aspherically.

A second and a fourth lens-element group G2 and G4 have a positive refractive power and are displaced simultaneously for focusing along the lines indicated underneath. Both focusing elements are embodied as single lens elements.

Arranged between the focusing elements is a stationary lens-element group G3 having a negative total refractive power, which consists of a first convexo-concave lens element G3L1 having a negative refractive power and a second concavo-convex lens element G3L2 having a positive refractive power. This central group is stationary and encloses an aperture stop (iris diaphragm) AP.

The back lens-element group G5, which is likewise stationary, has overall a negative refractive power and consists of a first biconvex lens element G5L1 having a positive refractive power and a second biconcave lens element G5L2 having a negative refractive power, which are joined together as a cemented element having overall a positive refractive power, and a third concavo-convex lens element G1L3 having a negative refractive power.

The lens-element section illustrated in FIG. 2 deviates from the lens-element section described with regard to FIG. 1 merely in the back lens-element group G5, wherein the lens elements G5L1, G5L2 and G5L3 are embodied as single lenses having the refractive power sequence (−), (+), (−). Moreover, three of the lens-element surfaces are embodied as aspherical surfaces.

The lens-element section illustrated in FIG. 3 deviates from the lens-element section described with regard to FIG. 1 merely in the front lens-element group G1 by virtue of the fact that the lens element G1L2 is realized as a convexo-concave lens element having a negative refractive power and having an aspherical front surface and the cemented element G1L3/G1L4 has overall a positive refractive power.

The lens-element section illustrated in FIG. 4 deviates from the lens-element section described with regard to FIG. 1 in the configuration of the front lens-element group G1, which here consists of only two lens elements, a first convexo-concave lens element G1L1 having a positive refractive power and a lens-element doublet G1L2/G1L3 having a negative total refractive power, consisting of a biconvex lens element G1L2 having a positive refractive power and a biconcave lens element G1L3 having a negative refractive power. In addition, the back lens-element group G5 is composed of three single lens elements G5L1, G5L2 and G5L3 having the refractive power sequence as illustrated with regard to FIG. 2. Moreover, a plurality of surfaces are embodied aspherically.

In the case of the lens-element section illustrated in FIG. 5, the front lens-element group consists of two lens elements, wherein the second lens element is embodied as a cemented element G1L2/G1L3 having overall a positive refractive power. The central group G3 consists of a first convexo-concave lens element G3L1 having a negative refractive power upstream of the aperture stop (iris diaphragm) AP, a second biconcave lens element G3L2 having a negative refractive power downstream of the aperture stop (iris diaphragm) AP, a biconvex lens element having a positive refractive power G3L3 and a fourth lens element G3L4/G3L5 embodied as a cemented element and having overall a positive refractive power. The back lens-element group G5 consists of two lens elements, of which the first is embodied as a lens-element doublet (cemented element) having a biconvex lens element G5L1 having a positive refractive power and a biconcave lens element G5L2 having a negative refractive power, and a thin convexo-concave lens element having a negative refractive power. The convex lens-element surface is embodied aspherically.

The imaging is carried out in each case onto an image plane IM.

In the case of the circular imaging plane IM illustrated schematically in FIG. 6, a double-headed arrow represents an image circle diameter Bd, which corresponds to the diameter of an image sensor Bs illustrated in a rectangular fashion.

For all figures of the drawing relating to lens-element sections, the lens-element surfaces identified by an * are embodied aspherically.

The lens-element sections in the drawing are illustrated to scale, such that relative indications, such as e.g. the material thickness in the case of the lens element G3L1 in FIG. 1, which is considerably thinner in the lens-element center in comparison with the material thickness at the lens-element edge, can be diagrammatically established and checked using conventional geometric means. What is likewise disclosed in this way is that in FIG. 1 the lens element G3L2 has in the lens-element center a material thickness almost exactly four times (4.25 times) thicker than the lens element G2. These relationships are readily apparent to the person skilled in the art.

In all lens variants, the five lens-element groups described and illustrated individually represent a specifically necessary, self-contained constituent. Each of the lens-element groups can be optically tuned by itself, which is expressed in particular by the ratio of focal length specified for each lens-element group to the total focal length.

Concrete exemplary embodiments are evident from the tables below for lenses with 75 mm and 90 mm with a maximum aperture number of 2 and 1.4, wherein the focal lengths are in each case relative to the full-frame format (43.3 mm image circle diameter).

FIG. 1

| 1:2 75 mm | | Refractive index ne | Abbe number ve | SCD | Refractive power [dpt.] |
|---|---|---|---|---|---|
| G1 | G1L1 | 1.85504 | 23.59 | 0.153 | 15.1 |
|  | G1L2 | 1.49845 | 81.15 | 0.240 | 3.0 |
|  | G1L3 | 1.62033 | 63.02 | 0.082 | −16.5 |
|  | G1L4 | 1.81264 | 25.22 | 0.131 |  |
| G2 |  | 1.49845 | 81.15 | 0.240 | 12.3 |
| G3 | G3L1 | 1.59911 | 38.97 | −0.019 | −12.0 |
|  | G3L2 | 1.88815 | 40.52 | −0.107 | 1.1 |
| G4 |  | 1.62033 | 63.02 | 0.082 | 12.6 |
| G5 | G5L1 | 1.88815 | 40.52 | −0.107 | 7.9 |
|  | G5L2 | 1.60718 | 37.76 | −0.012 |  |
|  | G5L3 | 1.58482 | 40.47 | −0.019 | −13.3 |

FIG. 2

| 1:2 75 mm | | Refractive index ne | Abbe number ve | SCD | Refractive power [dpt.] |
|---|---|---|---|---|---|
| G1 | G1L1 | 1.85504 | 23.59 | 0.153 | 10.1 |
|  | G1L2 | 1.49845 | 81.15 | 0.240 | 9.2 |
|  | G1L3 | 1.49845 | 81.15 | 0.240 | −18.5 |
|  | G1L4 | 1.74617 | 28.07 | 0.075 |  |
| G2 |  | 1.49845 | 81.15 | 0.240 | 10.9 |
| G3 | G3L1 | 1.72538 | 34.47 | −0.089 | −13.2 |
|  | G3L2 | 1.51872 | 63.96 | −0.012 | 2.2 |
| G4 |  | 1.60520 | 65.16 | 0.072 | 16.8 |
| G5 | G5L1 | 1.65803 | 39.46 | −0.119 | −12.6 |
|  | G5L2 | 1.85500 | 23.69 | 0.172 | 14.4 |
|  | G5L3 | 1.62409 | 36 | −0.001 | −17.0 |

FIG. 3

| 1:2 75 mm | | Refractive index ne | Abbe number ve | SCD | Refractive power [dpt.] |
|---|---|---|---|---|---|
| G1 | G1L1 | 1.85649 | 32.03 | −0.005 | 17.1 |
|  | G1L2 | 1.55098 | 45.49 | −0.007 | −16.9 |
|  | G1L3 | 1.62033 | 63.02 | 0.082 | 1.6 |
|  | G1L4 | 1.67765 | 31.85 | 0.042 |  |
| G2 |  | 1.49845 | 81.15 | 0.240 | 14.3 |
| G3 | G3L1 | 1.67765 | 31.85 | 0.042 | −13.1 |
|  | G3L2 | 1.60520 | 65.16 | 0.072 | 2.6 |
| G4 |  | 1.88815 | 40.52 | −0.107 | 14.4 |
| G5 | G5L1 | 1.88815 | 40.52 | −0.107 | 6.0 |
|  | G5L2 | 1.61664 | 44.27 | −0.147 |  |
|  | G5L3 | 1.65222 | 33.53 | 0.022 | −13.4 |

FIG. 4

| 1:2 75 mm | | Refractive index ne | Abbe number ve | SCD | Refractive power [dpt.] |
|---|---|---|---|---|---|
| G1 | G1L1 | 1.81643 | 22.57 | 0.286 | 14.5 |
|  | G1L2 | 1.43985 | 94.49 | 0.327 | −15.0 |
|  | G1L3 | 1.74617 | 28.07 | 0.075 |  |
| G2 |  | 1.43985 | 94.49 | 0.327 | 12.1 |
| G3 | G3L1 | 1.81643 | 22.57 | 0.286 | −18.3 |
|  | G3L2 | 1.60520 | 65.16 | 0.072 | 11.7 |
| G4 |  | 1.60520 | 65.16 | 0.072 | 14.4 |
| G5 | G5L1 | 1.65803 | 39.46 | −0.119 | −11.1 |
|  | G5L2 | 1.97188 | 17.33 | 0.755 | 12.1 |
|  | G5L3 | 1.62408 | 36.16 | −0.002 | −18.1 |

FIG. 5

| 1:1.4 75 mm | | Refractive index ne | Abbe number ve | SCD | Refractive power [dpt.] |
|---|---|---|---|---|---|
| G1 | G1L1 | 1.85504 | 23.59 | 0.153 | 9.5 |
|  | G1L2 | 1.49845 | 81.15 | 0.240 | 1.0 |

-continued

FIG. 5

| | 1:1.4 75 mm | Refractive index ne | Abbe number ve | SCD | Refractive power [dpt.] |
|---|---|---|---|---|---|
| | G1L3 | 1.65803 | 39.46 | −0.119 | |
| | G1L4 | 1.49845 | 81.15 | 0.240 | 3.2 |
| G2 | | 1.76859 | 26.3 | 0.112 | −16.2 |
| G3 | G3L1 | 1.72539 | 34.47 | −0.092 | −18.9 |
| | G3L2 | 1.88815 | 40.52 | −0.107 | 18.6 |
| | G3L3 | 1.70442 | 29.89 | 0.047 | 6.3 |
| | G3L4 | 1.49845 | 81.15 | 0.240 | |
| G4 | | 1.62033 | 63.02 | 0.082 | 10.2 |
| G5 | G5L1 | 1.93429 | 18.74 | 0.553 | 1.0 |
| | G5L2 | 1.81643 | 22.57 | 0.286 | |
| | G5L3 | 1.85504 | 22.59 | 0.153 | −11.9 |

What is claimed is:

1. A lens system with a fixed focal length, comprising:
five lens groups, wherein three lens groups are mounted in a stationary manner and two lens groups are mounted in a displaceable manner along an optical axis, wherein the lens system comprises the following lens groups in order from an object side of the lens system to an image side:
a first lens group as viewed from an object side is arranged in a stationary manner,
a second lens group configured as a focusing front group is arranged in a displaceable manner,
a third lens group containing a stationary iris diaphragm, the aperture of which is adjustable, configured as a lens group that is arranged in a stationary manner,
a fourth lens group configured as a focusing back group is arranged in a displaceable manner, and
a fifth lens group is arranged in a stationary manner, and wherein
both the focusing front group and the focusing back group are movable jointly relative to one another and to the lens groups arranged in a stationary manner, in order to provide focusing of the lens system,
the first lens group has a positive refractive power and the third lens group and the fifth lens group each have a negative refractive power,
each of the focusing front group and the focusing back group consist of only a single lens, and
the third lens group consists of a negative lens element and a positive lens element and the iris diaphragm, with the iris diaphragm being arranged in a stationary manner between the negative element and the positive lens element, or
the third lens group consists of three negative lens elements two positive lens elements and the iris diaphragm, with a positive lens and one of the negative lens elements being combined to form a lens doublet having a positive total refractive power and the iris diaphragm is arranged in a stationary manner between the other two negative lens elements.

2. The lens system as claimed in claim 1, wherein the focusing front group and the focusing back group each have a positive refractive power.

3. The lens system as claimed in claim 2, wherein both the focusing front group and the focusing back group move away from the imaging plane during focusing from infinity to the near setting.

4. The lens system as claimed in claim 3, wherein
the ratio f1/f of the focal lengths f1 of the first lens group and f of the entire lens system lies between 0.5 and 30,
the ratio f2/f of the focal lengths f2 of the focusing front group and f of the entire lens system lies between 0.3 and 10,
the ratio f3/f of the focal lengths f3 of the third lens group and f of the entire lens system lies between −30 and −0.3,
the ratio f4/f of the focal lengths f4 of the focusing back group and f of the entire lens system lies between 0.1 and 10, and
the ratio f5/f of the focal lengths f5 of the fifth lens group and f of the entire lens system lies between −40 and −0.1.

5. The lens system as claimed in claim 4, wherein the lens system has a ratio of the total focal length f to the image circle diameter in the imaging plane of between 1 and 5.

6. The lens system as claimed in claim 5, wherein the ratio V of the volume of the focusing front group and focusing back group to the image circle diameter Bd in the imaging plane raised to the third power lies below 0.1 (V/Bd$^3$<0.1) or the weight of the respective focusing front group and focusing back group lies below 15 g.

7. The lens system as claimed in claim 6, wherein
the first lens group consists of three positive lens elements and one negative lens element, with a positive lens and a negative lens being combined to form a lens doublet having a negative total refractive power, or
the first lens group consists of two positive lens elements and two negative lens element, with a positive lens and a negative lens being combined to form a lens doublet having a positive total refractive power, or
the first lens group consists of two positive lens elements and one negative lens element, with a positive lens and a negative lens being combined to form a lens doublet having a negative or positive total refractive power.

8. The lens system as claimed in claim 7, wherein either
the fifth lens group consists of two negative lens elements and one positive lens element, with a positive lens and a negative lens being combined to form a lens doublet having a positive total refractive power, or
the fifth lens group consists of two negative lens elements and one positive lens element.

9. The lens system as claimed in claim 8, wherein at least one of the five lens groups contains a lens element having one or two aspherical surfaces.

10. The lens system as claimed in claim 9, wherein the fifth lens group contains at least one lens element comprising an optical material having a refractive index ne of greater than 1.8.

11. The lens system as claimed in claim 10, wherein the third lens group contains at least one lens element comprising an optical material having anomalous partial dispersion SCD of less than −0.07 or greater than 0.07.

12. The lens system as claimed in claim 11, wherein the first lens group contains at least one lens element comprising an optical material having anomalous partial dispersion SCD of greater than 0.07.

13. The lens system as claimed in claim 12, wherein at least one of the focusing front group and focusing rear group contains a lens element comprising an optical material having anomalous partial dispersion SCD of greater than 0.07.

14. The lens system as claimed in claim 5, wherein the ratio V of the volume of the focusing front group and focusing back group to the image circle diameter Bd in the imaging plane raised to the third power lies below 0.08 ($V/Bd^3<0.1$) or the weight of the respective focusing front group and focusing back group lies below 15 g.

15. The lens system as claimed in claim 1, wherein
the first lens group consists of three positive lens elements and one negative lens element, with a positive lens and a negative lens being combined to form a lens doublet having a negative total refractive power, or
the first lens group consists of two positive lens elements and two negative lens element, with a positive lens and a negative lens being combined to form a lens doublet having a positive total refractive power, or
the first lens group consists of two positive lens elements and one negative lens element, with a positive lens and a negative lens being combined to form a lens doublet having a negative or positive total refractive power.

16. The lens system as claimed in claim 7, wherein either
the fifth lens group consists of two negative lens elements and one positive lens element, with a positive lens and a negative lens being combined to form a lens doublet having a positive total refractive power, or
the fifth lens group consists of two negative lens elements and one positive lens element.

17. A lens system with a fixed focal length, comprising:
five lens groups, wherein three lens groups are mounted in a stationary manner and two lens groups are mounted in a displaceable manner along an optical axis, wherein
the lens system comprises the following lens groups in order from an object side of the lens system to an image side:
a first lens group as viewed from an object side is arranged in a stationary manner,
a second lens group configured as a focusing front group is arranged in a displaceable manner,
a third lens group containing a stationary iris diaphragm, the aperture of which is adjustable, configured as a lens group that is arranged in a stationary manner,
a fourth lens group configured as a focusing back group is arranged in a displaceable manner, and
a fifth lens group is arranged in a stationary manner, and wherein
both the focusing front group and the focusing back group are movable jointly relative to one another and to the lens groups arranged in a stationary manner, in order to provide focusing of the lens system,
the first lens group has a positive refractive power and the third lens group and the fifth lens group each have a negative refractive power,
each of the focusing front group and the focusing back group consist of only a single lens, and
the first lens group has only one of the following three configurations:
i) a first configuration in which the first lens group consists of three positive lens elements and one negative lens element, with a positive lens and a negative lens being combined to form a lens doublet having a negative total refractive power, or
ii) a second configuration in which the first lens group consists of two positive lens elements and two negative lens element, with a positive lens and a negative lens being combined to form a lens doublet having a positive total refractive power, or
iii) a third configuration in which the first lens group consists of two positive lens elements and one negative lens element, with a positive lens and a negative lens being combined to form a lens doublet having a negative or positive total refractive power.

* * * * *